(12) United States Patent
Srivastava et al.

(10) Patent No.: US 11,411,972 B2
(45) Date of Patent: Aug. 9, 2022

(54) METHODS, SYSTEMS, AND MEDIA FOR DYNAMICALLY SEPARATING INTERNET OF THINGS DEVICES IN A NETWORK

(71) Applicant: McAfee, LLC, Santa Clara, CA (US)

(72) Inventors: Himanshu Srivastava, Bangalore (IN); Tirumaleswar Reddy Konda, Bengaluru (IN); Piyush P. Joshi, Aurangabad (IN); Harsha R. Joshi, Bangalore (IN); Srikanth Nalluri, Bangalore (IN); Dattatraya Kulkarni, Bangalore (IN); Siddaraya Revashetti, Cupertino, CA (US)

(73) Assignee: McAfee, LLC, San Jose, CA (US)

( * ) Notice: Subject to any disclaimer, the term of this patent is extended or adjusted under 35 U.S.C. 154(b) by 108 days.

(21) Appl. No.: 16/189,637

(22) Filed: Nov. 13, 2018

(65) Prior Publication Data

US 2020/0153846 A1    May 14, 2020

(51) Int. Cl.
| | |
|---|---|
| *H04L 29/06* | (2006.01) |
| *H04L 9/40* | (2022.01) |
| *H04W 4/80* | (2018.01) |
| *H04W 4/70* | (2018.01) |
| *H04L 61/5014* | (2022.01) |

(52) U.S. Cl.
CPC ...... *H04L 63/1425* (2013.01); *H04L 61/2015* (2013.01); *H04L 63/10* (2013.01); *H04W 4/70* (2018.02); *H04W 4/80* (2018.02)

(58) Field of Classification Search
CPC . H04L 63/1425; H04L 63/10; H04L 61/2015; H04L 9/32; H04L 9/08; H04W 4/80; H04W 4/70

USPC ..... 726/3, 12, 14, 22–25; 713/153, 158, 166
See application file for complete search history.

(56) References Cited

U.S. PATENT DOCUMENTS

| | | | |
|---|---|---|---|
| 10,313,384 B1* | 6/2019 | Banga | H04L 63/20 |
| 10,742,674 B1* | 8/2020 | McLinden | H04L 63/1416 |
| 2009/0222582 A1* | 9/2009 | Josefsberg | H04L 41/0654 |
| | | | 709/245 |
| 2013/0047257 A1* | 2/2013 | Aziz | G06F 9/45537 |
| | | | 726/24 |
| 2016/0128043 A1* | 5/2016 | Shuman | H04W 72/044 |
| | | | 370/329 |

(Continued)

FOREIGN PATENT DOCUMENTS

KR    1020170039262    4/2017

OTHER PUBLICATIONS

International Search Report and Written Opinion dated Mar. 9, 2020 in International Patent Application No. PCT/US2019/061106.

*Primary Examiner* — Saleh Najjar
*Assistant Examiner* — Khalid M Almaghayreh
(74) *Attorney, Agent, or Firm* — Byrne Poh LLP

(57) ABSTRACT

Methods, systems, and media for dynamically separating Internet of Things (IoT) devices in a network are provided. In accordance with some embodiments of the disclosed subject matter, a method for dynamically separating IoT devices in a network is provided, the method comprising: detecting a first IoT device in the network; monitoring network communication of the first IoT device; determining device information of the first IoT device based on the monitored network communication; and causing the first IoT device to communicate on a first subnet of a plurality of subnets in the network based on the device information.

15 Claims, 7 Drawing Sheets

(56) References Cited

U.S. PATENT DOCUMENTS

| | | | |
|---|---|---|---|
| 2017/0104774 A1* | 4/2017 | Vasseur | G06N 20/00 |
| 2017/0149775 A1* | 5/2017 | Bachar | H04L 67/10 |
| 2018/0013761 A1* | 1/2018 | Bachar | H04L 67/12 |
| 2019/0036965 A1* | 1/2019 | Luo | H04L 63/1425 |
| 2019/0069173 A1* | 2/2019 | Fukushima | H04W 12/06 |
| 2019/0296979 A1* | 9/2019 | Gupta | G06N 3/08 |
| 2019/0354367 A1* | 11/2019 | Rodriguez Bravo | G06F 21/57 |

\* cited by examiner

METHODS, SYSTEMS, AND MEDIA FOR DYNAMICALLY SEPARATING INTERNET OF THINGS DEVICES IN A NETWORK

TECHNICAL FIELD

The disclosed subject matter relates to methods, systems, and media for dynamically separating Internet of Things (IoT) devices in a network.

BACKGROUND

A typical smart home network can include many diverse kinds of Internet of Things (IoT) devices. For example, IoT devices include smart thermostats, smart home devices (e.g., an alarm clock, an electric toothbrush, a scale, a lock, a voice over Internet Protocol (VoIP) phone, and/or any other suitable home device), smart personal assistants, smart exercise machines, smart appliances (e.g., lighting systems, kitchen appliances, washers, dryers, fire alarms, spray systems, and/or any other suitable appliances), smart media systems (e.g., a television, a speaker, a streaming media device, a virtual assistant device, and/or any other suitable media device), smart computing devices (e.g., a mobile phone, a printer, a computer, a network router, and/or any other suitable computing device), smart heating, ventilation, and air conditioning (HVAC) systems, smart security systems, and/or any other suitable device capable of connecting to a network to transmit and receive data. Many of these IoT devices are always connected to the Internet or frequently connect to the Internet to communicate with external servers (e.g., IoT gateways). Additionally, many IoT devices can be controlled from outside the home network via remote access or from inside the home network via WI-FI, BLUETOOTH, etc., where users can access and program the IoT devices directly or via the external servers.

However, many IoT device vendors are inexperienced in security or are driven by market factors that lead to security being a lower priority, which can leave IoT devices vulnerable to unauthorized access or infection with malwares, botnets, ransomwares, etc. Moreover, conventional home networks are not secure and are flat networks, and thus attackers can leverage unrestricted access to the entire home network through a compromised IoT device to spread the attack to other devices inside the network.

Accordingly, it is desirable to provide new methods, systems, and media for dynamically separating IoT devices in a network.

SUMMARY

Methods, systems, and media for dynamically separating Internet of Things (IoT) devices in a network are provided. In accordance with some embodiments of the disclosed subject matter, a method for dynamically separating IoT devices in a network is provided, the method comprising: detecting a first IoT device in the network; monitoring network communication of the first IoT device; determining device information of the first IoT device based on the monitored network communication; and causing the first IoT device to communicate on a first subnet of a plurality of subnets in the network based on the device information.

In some embodiments, the method further comprises assigning to the first IoT device a first Internet Protocol (IP) address corresponding to the first subnet.

In some embodiments, the method further comprises restricting communication between the first IoT device configured to communicate on the first subnet and a second IoT device configured to communicate on a second subnet of the plurality of subnets.

In some embodiments, the method further comprises dynamically creating the first subnet in response to determining the device information.

In some embodiments, the method further comprises causing the first IoT device configured to communicate on the first subnet to communicate on a third subnet of the plurality of subnets.

In some embodiments, causing the first IoT device to communicate on the third subnet comprises sending at least one Dynamic Host Configuration Protocol (DHCP) message causing the first IoT device to reconfigure with a second IP address corresponding to the third subnet.

In some embodiments, the method further comprises detecting an anomaly associated with the first IoT device; and, in response to detecting the anomaly, causing the first IoT device to communicate on a fourth subnet of the plurality of subnets, wherein each IoT device configured to communicate on the fourth subnet is prevented from communicating with any IoT device configured to communicate on any other subnet of the plurality of subnets.

In accordance with some embodiments of the disclosed subject matter, a system for dynamically separating IoT devices in a network is provided, the system comprising: a hardware processor that is configured to: detect a first IoT device in the network; monitor network communication of the first IoT device; determine device information of the first IoT device based on the monitored network communication; and cause the first IoT device to communicate on a first subnet of a plurality of subnets in the network based on the device information.

In accordance with some embodiments of the disclosed subject matter, a non-transitory computer-readable medium containing computer-executable instructions that, when executed by a processor, cause the processor to perform a method for dynamically separating IoT devices in a network is provided, the method comprising: detecting a first IoT device in the network; monitoring network communication of the first IoT device; determining device information of the first IoT device based on the monitored network communication; and causing the first IoT device to communicate on a first subnet of a plurality of subnets in the network based on the device information.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
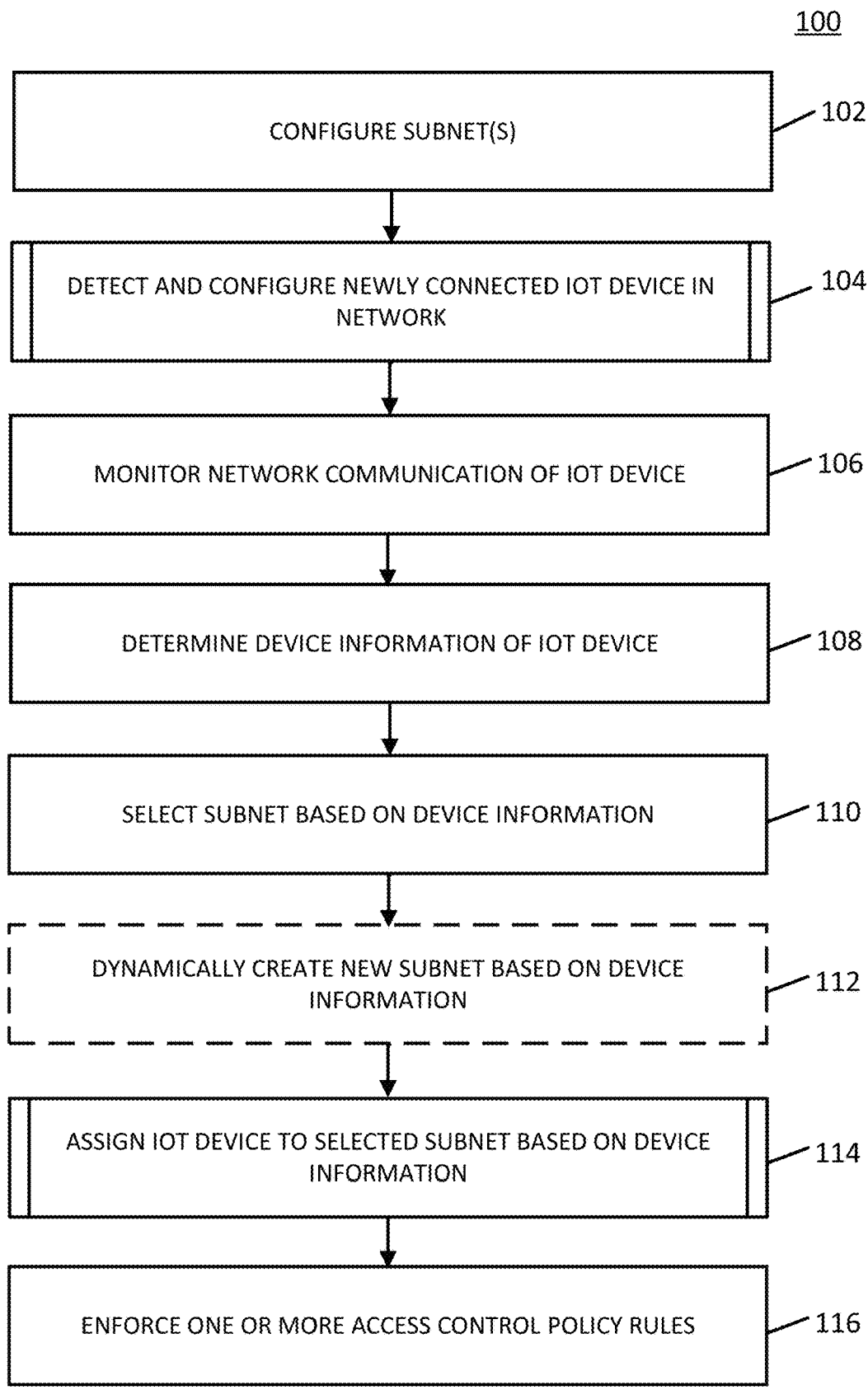
FIG. 1 shows an example of a process for dynamically separating Internet of Things (IoT) devices in a network in accordance with some embodiments of the disclosed subject matter.

In accordance with various embodiments, mechanisms (which can include methods, systems, and media) for dynamically separating Internet of Things (IoT) devices in a network are provided.

In some embodiments, the mechanisms described herein can configure one or more separation zones based on functional and/or security requirements. In some embodiments, the mechanisms described herein can determine a device category, device type, and/or device posture of an IoT device, such as a smart thermostat, smart home device, smart personal assistant, smart exercise machine, smart appliance, smart media system, smart computing device, smart heating, ventilation, and air conditioning (HVAC) system, smart security system, and/or any other suitable IoT device. The mechanisms described herein can then cause the IoT device to communicate in accordance with a selected separation zone based on the determined device category, device type, and/or device posture in some embodiments. In some embodiments, the mechanisms described herein can control communication among separation zones based on one or more access control policy rules.

In some embodiments, the mechanisms described herein can configure a plurality of subnets and cause an IoT device to communicate on one of the subnets based on the device category, device type, and/or device posture of the IoT device. For example, in some embodiments, the mechanisms described herein can send one or more Dynamic Host Configuration Protocol (DHCP) messages to force the IoT device to reconfigure with an Internet Protocol (IP) address associated with one of the subnets. Furthermore, in some embodiments, the mechanisms described herein can remove an IoT device that fails to reconfigure from a network.

In some embodiments, the mechanisms described herein can configure an isolation subnet that is restricted from communicating across subnets and is only permitted to communicate with specific devices, such as a remediation server. In some embodiments, the mechanisms described herein can detect an anomaly associated with an IoT device and cause the compromised IoT device to communicate on the isolation subnet. For example, in some embodiments, the mechanisms described herein can send one or more DHCP messages to force the compromised IoT device to reconfigure with an IP address associated with the isolation subnet.

In some embodiments, the mechanisms described herein can be used to improve computer security by controlling communication between devices of a network in a scalable and seamless fashion. For example, in some embodiments, the mechanisms described herein can close a security gap by restricting communication between devices that have no functional requirement to communicate with each other. As a more particular example, a smart lightbulb that is connected to a network may not have a need to communicate with a printer that is also connected to the network, and thus communication between the lightbulb and the printer can be restricted to mitigate a potential vulnerability in the network. Additionally, in some embodiments, the mechanisms described herein can improve security by proactively quarantining vulnerable devices and/or preventing lateral movement of malware and other infections across a network.

Turning to FIG. 1, an example 100 of a process for dynamically separating IoT devices in a network in accordance with some embodiments of the disclosed subject matter is shown. As illustrated, blocks of process 100 can be executed by one or more routers, one or more servers, as shown and described below in connection with FIGS. 5-7, and/or any other suitable computing device(s).

At 102, process 100 can configure one or more separation zones of a network into which devices can be assigned. For example, in some embodiments, each separation zone can be implemented as a distinct subnet of the network, and process 100 can configure a plurality of subnets into which a plurality of IoT devices can be selectively assigned. As a more particular example, in some embodiments, process 100 can configure a plurality of subnets on which a plurality of IoT devices can be selectively configured to communicate. In some embodiments, process 100 can configure separation zones (e.g., subnets) based on functional and/or security requirements. For example, in some embodiments, process 100 can configure one separation zone for each device category, each device type, and/or each device posture.

In some embodiments, IoT devices can include smart thermostats, smart home devices (e.g., an alarm clock, an electric toothbrush, a scale, a lock, a voice over IP (VoIP) phone, and/or any other suitable home device), smart personal assistants, smart exercise machines, smart appliances (e.g., lighting systems, kitchen appliances, washers, dryers, fire alarms, spray systems, and/or any other suitable appliances), smart media systems (e.g., a television, a speaker, a streaming media device, a virtual assistant device, and/or any other suitable media device), smart computing devices (e.g., a mobile phone, a printer, a computer, a network router, and/or any other suitable computing device), smart HVAC systems, smart security systems, and/or any other suitable device capable of connecting to a network to transmit and receive data.

In some embodiments, the device categories can include a "mobile" category, a "multimedia" category, a "home office" category, a "home automation" category, a "network" category, and/or any other suitable category. In some embodiments, the device types within the "home automation" category can include a smart IP camera, a smart plug, a smart light, a smart thermostat, a smart meter, a smart solar panel, a smart washer, a smart dryer, a smart refrigerator, a smart alarm, a smart smoke detector, a smart hub, and/or any other suitable smart home device. Accordingly, in some embodiments, process 100 can configure a home automation subnet into which IoT devices having these device types can be assigned.

Additionally or alternatively, in some embodiments, process 100 can configure one or more subnets corresponding to respective device postures, such as "isolated," "newly connected," "administrator," "high priority," and/or any other suitable device posture. For example, in some embodiments, an isolation subnet can be configured to quarantine vulnerable IoT devices, such as devices that have been infected by malware, ransomware, botnets, etc. As another example, in some embodiments, a high priority subnet can be configured for critical IoT devices, such as a smart lock, a security alarm, a fire alarm, a secure server, and/or any other suitable device.

In some embodiments, each separation zone can be associated with one or more access control policy rules to control communication of devices assigned thereto based on functional and/or security requirements. For example, in some embodiments, the access control policy rules can include one or more rules to allow communication between devices in the same separation zone and/or with devices in one or more other separation zones. As another example, in some embodiments, the access control policy rules can include one or more rules to restrict communication with certain devices, certain separation zones, and/or across all separation zones. As yet another example, in some embodiments, the access control policy rules can include one or more rules to restrict communication with external networks (e.g., the Internet) and/or to allow communication with certain devices (e.g., administrator device, remediation server, etc.). As yet another example, in some embodiments, the access control policy rules can include one or more rules to allow connection of specific devices (e.g., MAC allow list) and/or to restrict connection of specific devices (e.g., MAC deny list). As yet another example, in some embodiments, the access control policy rules can include one or more rules to restrict access and/or discovery of an IoT device (e.g., an IoT device having a high priority device posture) to specific devices. In some embodiments, the access control rules can include any other suitable rule.

It is noted that, in some embodiments, each separation zone can be configured with the same service set identifier (SSID) but different basic service set identifiers (BSSIDs). Accordingly, devices need not be configured with different security credentials in some embodiments.

In some embodiments, a separation zone can be preconfigured based on predetermined device categories, device types, and/or device postures. For example, in some embodiments, an isolation zone can be preconfigured such that devices assigned to the isolation zone can be prevented from communicating with devices in other separation zones and/or can only be allowed to communicate with specific devices (e.g., administrator device, remediation server, and/or any other suitable devices).

Additionally or alternatively, in some embodiments, a separation zone or subnet can be dynamically added and/or removed based on one or more factors. For example, in some embodiments, a separation zone can be dynamically added or removed based on functional and/or security requirements of the network. As a more particular example, in some embodiments, a new separation zone can be dynamically added if it is determined that a separation zone corresponding to a particular device category, device type, and/or device posture is not already configured.

At 104, process 100 can detect and configure a newly connected IoT device in a network. For example, in some embodiments, process 100 can detect the IoT device and assign the IoT device a temporary IP address. In some embodiments, network communication via the temporary IP address can indicate a device category, a device type, and/or a device posture of the IoT device. In some embodiments, process 100 can cause the IoT device to communicate on a "newly connected" subnet of the network. In some embodiments, process 100 can detect and configure the IoT device in the network in any suitable manner, such as in the manner shown and described in connection with FIG. 2.

Figure 2:
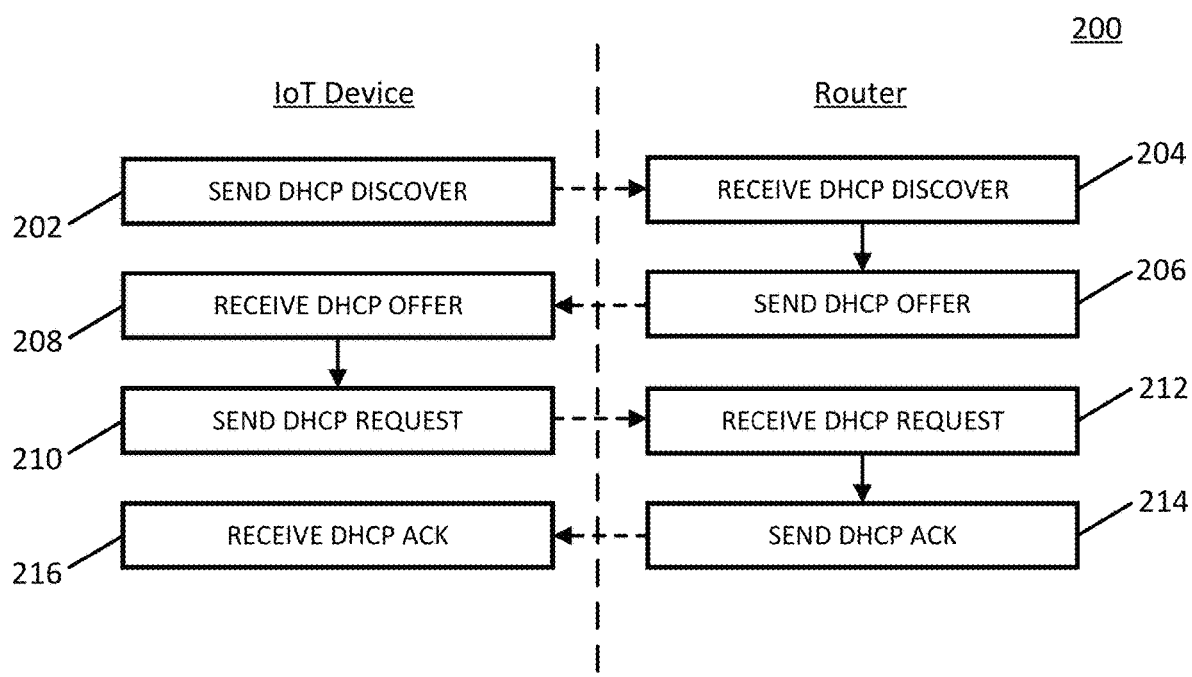
FIG. 2 shows an example of a flow diagram for detecting and configuring an IoT device in a network in accordance with some embodiments of the disclosed subject matter.

Turning to FIG. 2, an example 200 of a flow diagram for detecting and configuring an IoT device in a network in accordance with some embodiments of the disclosed subject matter is shown. As illustrated, blocks of flow diagram 200 can be executed by one or more routers, one or more servers, one or more IoT devices, as shown and described below in connection with FIGS. 5-7, and/or any other suitable computing device(s).

At 202, an IoT device newly connected to a network can send a DHCP DISCOVER message. For example, in some embodiments, the IoT device can broadcast the DHCP DISCOVER message.

At 204, a router can receive the DHCP DISCOVER message from the IoT device.

At 206, the router can respond to the IoT device with a DHCP OFFER message. For example, in some embodiments, the router can broadcast a DHCP OFFER message assigning an IP address to the IoT device for a relatively short lease time (e.g., five minutes). In some embodiments, the assigned IP address can correspond to a "newly connected" subnet.

At 208, the IoT device can receive the DHCP OFFER message from the router.

At 210, the IoT device can send a DHCP REQUEST message to the router. For example, in some embodiments, the IoT device can broadcast a DHCP REQUEST message requesting the IP address.

At 212, the router can receive the DHCP REQUEST message from the IoT device.

At 214, the router can respond to the IoT device with a DHCP ACK message.

At 216, the IoT device can receive the DHCP ACK message from the IoT device.

Turning back to FIG. 1, at 106, process 100 can monitor network communication of the newly connected IoT device. For example, in some embodiments, process 100 can monitor traffic (e.g., DNS, DHCP, HTTP) from the IoT device. Additionally or alternatively, in some embodiments, process 100 can probe the IoT device with various protocols (e.g., UPnP, NetBIOS, Bonjour, mDNS/DNS-SD, BLE, etc.) and can monitor for a response from the IoT device. It is noted that, in some embodiments, the IoT device can respond only to protocols supported by the IoT device. In some embodiments, process 100 can monitor network communication of the newly connected IoT device in any suitable manner.

At 108, process 100 can determine device information of the newly connected IoT device based on the monitored network communication. For example, in some embodiments, process 100 can determine a device category, a device type, a device posture, and/or any other suitable information of the IoT device based on the monitored network communication. As another example, in some embodiments, process 100 can generate a device fingerprint based on the monitored network communication and/or any other suitable information. Process 100 can then classify the IoT device into a device category, a device type, and/or a device posture based on the device fingerprint in some embodiments. It is noted that, in some embodiments, process 100 can classify the IoT device in any suitable manner, such as utilizing support vector machines (SVM), naïve Bayes classifiers, Bayesian networks, decision trees, machine learning models, neural networks, fuzzy logic models, probabilistic classification models, and/or any other suitable technique. As yet another example, in some embodiments, process 100 can input the device fingerprint and/or any other suitable information into a classifier (e.g., external server) and receive information indicating a device category, a device type, and/or a device posture of the IoT device as an output of the classifier. In some embodiments, process 100 can determine device information (e.g., device category, device type, device posture, and/or any other suitable information) of the IoT device in any suitable manner.

At 110, process 100 can select a separation zone into which the newly connected IoT device is to be assigned. For example, in some embodiments, process 100 can select a suitable separation zone based on the determined device category, device type, and/or device posture of the IoT device. In some embodiments, process 100 can select a suitable separation zone from previously configured separation zones. Alternatively, in some embodiments, process 100 can determine that the previously configured separation zones are not most suitable based on the determined device information of the IoT device and/or that a new separation zone should be added and selected based on the determined device information of the IoT device. In some embodiments, process 100 can select a separation zone in any suitable manner.

At 112, if it is determined that a new separation zone is to be added, process 100 can create a new separation zone corresponding to the determined device category, device type, and/or device posture of the IoT device. In some embodiments, creating a new separation zone can include configuring a new subnet in the network and associating one or more access control policy rules with the new subnet based on functional and/or security requirements.

At 114, process 100 can assign the newly connected IoT device to the selected separation zone (e.g., subnet). For example, in some embodiments, process 100 can cause the IoT device to communicate on a selected subnet. In some embodiments, process 100 can assign the newly connected IoT device to a selected subnet in any suitable manner, such as in the manner shown and described in connection with FIG. 3. In some embodiments, process 100 can add the newly connected IoT device to an allow list (e.g., MAC allow list) of the selected separation zone. In some embodiments, process 100 can assign the IoT device to a selected separation zone in any suitable manner.

Figure 3:
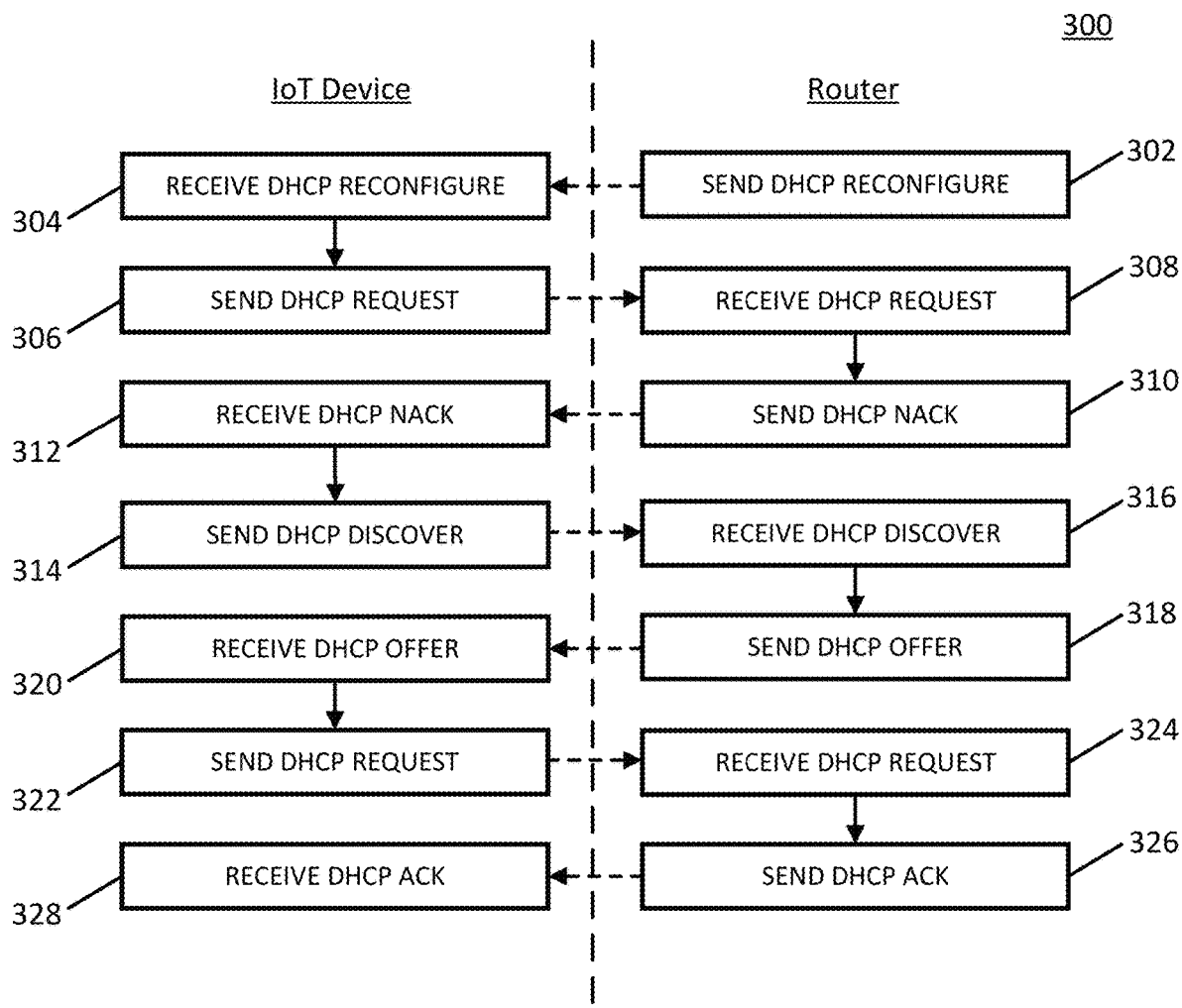
FIG. 3 shows an example of a flow diagram for assigning an IoT device to a selected subnet in accordance with some embodiments of the disclosed subject matter.

Turning to FIG. 3, an example 300 of a flow diagram for assigning an IoT device to a selected subnet in accordance with some embodiments of the disclosed subject matter is shown. As illustrated, blocks of information flow diagram 300 can be executed by one or more routers, one or more IoT devices, one or more servers, as shown and described below in connection with FIGS. 5-7, and/or any other suitable computing device(s).

At 302, a router can attempt to dynamically reconfigure an IoT device. For example, in some embodiments, the router can send a unicast DHCP RECONFIGURE message to an IoT device. As another example, in some embodiments, the router can send a unicast DHCP FORCERENEW message to the IoT device. It is noted that, in some embodiments, either one of the DHCP RECONFIGURE message and the DHCP FORCERENEW message can trigger dynamic reconfiguration of a host (e.g., IoT device) when the host supports the DHCP reconfigure extension.

At 304, the IoT device can receive the DHCP RECONFIGURE message and/or the DHCP FORCERENEW message from the router. In some embodiments, the IoT device can support DHCP reconfigure extension, and receipt of the DHCP RECONFIGURE message or the DHCP FORCERENEW message can force the IoT device to attempt to renew its IP address lease.

At 306, the IoT device can attempt to renew its IP address lease by sending a DHCP REQUEST message to the router. For example, in some embodiments, if the IoT device supports the DHCP reconfigure extension, then the IoT device can send the DHCP REQUEST message in response to receiving the DHCP RECONFIGURE message or the DHCP FORCERENEW message. Alternatively, if the IoT device does not support the DHCP reconfigure extension, then the IoT device can send the DHCP REQUEST message when its IP address lease is nearing expiration in some embodiments. In some embodiments, the DHCP REQUEST message can request renewal of the most-recently assigned IP address.

At 308, the router can receive the DHCP REQUEST message from the IoT device.

At 310, the router can respond to the DHCP REQUEST message by sending a DHCP NACK message to the IoT device.

At 312, the IoT device can receive the DHCP NACK message from the router.

At 314, in response to receiving the DHCP NACK message, the IoT device can broadcast a DHCP DISCOVER message.

At 316, the router can receive the DHCP DISCOVER message from the IoT device.

At 318, the router can respond to the DHCP DISCOVER message by assigning the IoT device a new IP address. For example, in some embodiments, the router can send a DHCP OFFER message assigning an available IP address associated with a separation zone or subnet selected based on the determined device category, device type, and/or device posture of the IoT device, such as in the manner discussed in connection with block 110 of FIG. 1.

In some embodiments, the DHCP lease time on the new IP address can be a predetermined amount of time (e.g., 24 hours) or can be determined based on one or more factors, such as a reputation score of the IoT device. For example, in some embodiments, the lease time can be calculated by multiplying a reputation score (e.g., number ranging from 1 to 10) of the IoT device by a predetermined time increment (e.g., 30 minutes). Accordingly, IoT devices with a low reputation score will receive a relatively shorter lease time than IoT devices with a high reputation score in some embodiments. Additionally, in some embodiments, the DHCP lease time for the new IP address can be selected based on whether the IoT device supports the DHCP reconfigure extension. For example, in some embodiments, the selected DHCP lease time on the new IP address can be the predetermined amount of time for IoT devices supporting the DHCP reconfigure extension while the selected DHCP lease time can be the calculated amount of time based on reputation score for IoT devices that do not support the DHCP reconfigure extension.

At 320, the IoT device can receive the DHCP OFFER message from the router.

At 322, the IoT device can send a DHCP REQUEST message to the router. For example, in some embodiments, the IoT device can broadcast a DHCP REQUEST message requesting the new IP address associated with the selected subnet.

At 324, the router can receive the DHCP REQUEST message from the IoT device.

At 326, the router can respond by sending a DHCP ACK message to the IoT device.

At 328, the IoT device can receive the DHCP ACK message from the router.

Turning back to FIG. 1, at 116, process 100 can enforce one or more access control policy rules. For example, in some embodiments, process 100 can control communication of the newly connected IoT device based on one or more access control policy rules associated with the selected separation zone, such as allowing the IoT device to communicate with other IoT devices assigned to a selected subnet while preventing the IoT device from communicating with IoT devices assigned to other subnets. As another example, in some embodiments, process 100 can determine that the IoT device has not reconfigured in response to being assigned to the selected separation zone or subnet, and process 100 can then remove the IoT device from the network based on security policies. As a more particular example, in some embodiments, process 100 can add the MAC address of the IoT device to a deny list of a host access point daemon (hostapd) and can deauthenticate the IoT device if the IoT device fails to reconfigure according to the assigned subnet. In some embodiments, process 100 can enforce any other suitable access control policy rule in any suitable manner.

Figure 4:
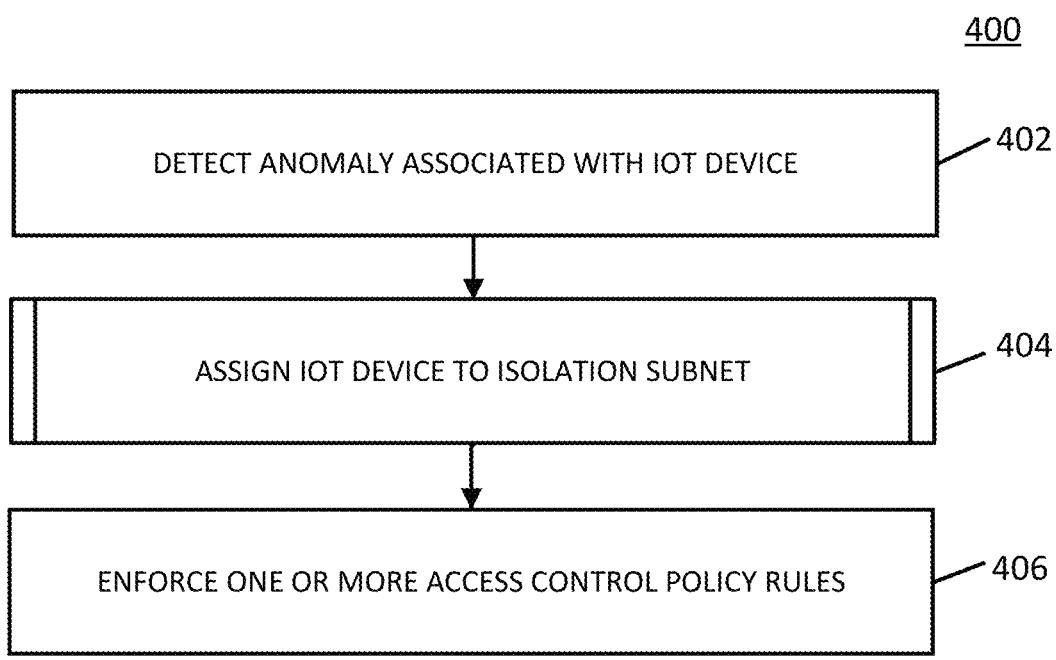
FIG. 4 shows an example of a process for dynamically isolating a compromised IoT device in accordance with some embodiments of the disclosed subject matter.

Turning to FIG. 4, an example 400 of a process for dynamically isolating a compromised IoT device in accordance with some embodiments of the disclosed subject matter is shown. As illustrated, blocks of process 400 can be executed by one or more routers, one or more servers, as shown and described below in connection with FIGS. 5-7, and/or any other suitable computing device(s).

At 402, process 400 can detect an anomaly associated with an IoT device. In some embodiments, process 400 can detect the anomaly in any suitable manner. For example, in some embodiments, process 400 can monitor network communication of the IoT device to detect the anomaly. As another example, in some embodiments, process 400 can receive information indicating that the IoT device is in a vulnerable state, such as when there is a known security issue associated with the IoT device or when the IoT device is not yet updated to a latest version. As yet another example, in some embodiments, process 400 can determine that the IoT device is infected with malware, ransomware, botnets, etc. It is noted that, in some embodiments, the anomaly associated with the IoT device can include malicious behavior associated with the IoT device.

At 404, process 400 can assign the compromised IoT device to an isolation zone (e.g., isolation subnet). For example, in some embodiments, process 400 can cause the compromised IoT device to communicate on the isolation subnet. In some embodiments, process 400 can assign the compromised IoT device to the isolation zone in any suitable manner, such as in the manner shown and described in connection with FIG. 3. In particular, process 400 can assign the compromised IoT device a new IP address associated with the isolation subnet in some embodiments.

At 406, process 400 can enforce one or more access control policy rules. For example, in some embodiments, process 400 can control communication of the compromised IoT device based on one or more access control policy rules associated with the isolation zone or subnet, such as preventing the compromised IoT device from communicating with devices in other separation zones and/or only allowing the compromised IoT device to communicate with specific devices (e.g., administrator device, remediation server, and/or any other suitable devices). As another example, in some embodiments, process 400 can determine that the compromised IoT device has not reconfigured in response to being assigned to the isolation zone or subnet, and process 400 can then remove the IoT device from the network based on security policies. As a more particular example, in some embodiments, process 400 can add the MAC address of the IoT device to a deny list of a host access point daemon (hostapd) and can deauthenticate the IoT device if the IoT device fails to reconfigure according to the assigned subnet. In some embodiments, process 400 can enforce any other suitable access control policy rule in any suitable manner.

Figure 5:
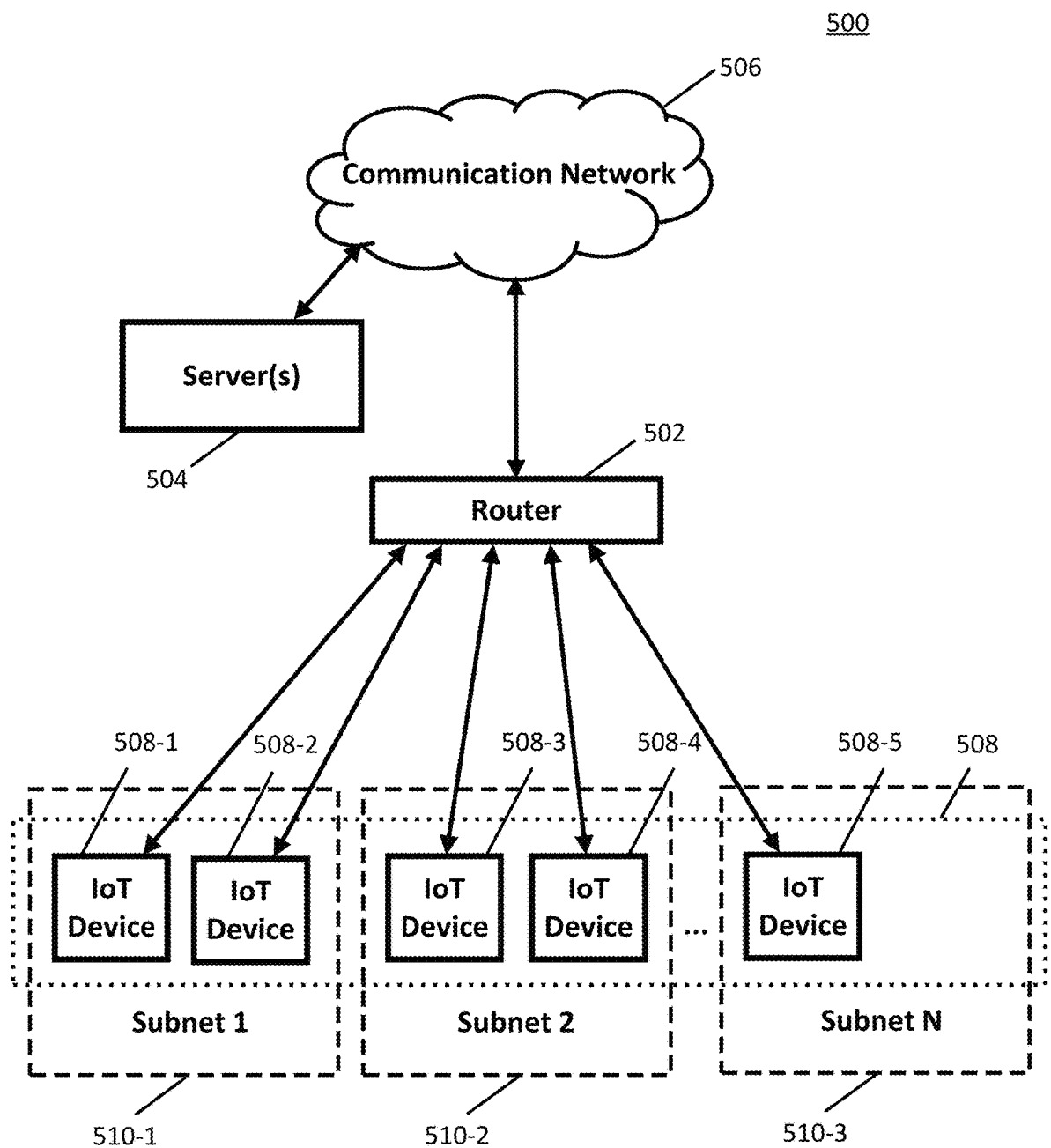
FIG. 5 shows an example of a block diagram of an illustrative system suitable for dynamically separating IoT devices in a network in accordance with some embodiments of the disclosed subject matter.

Turning to FIG. 5, an example 500 of hardware for dynamically separating IoT devices in a network that can be used in accordance with some embodiments of the disclosed subject matter is shown. As illustrated, hardware 500 can include a router 502, a server(s) 504, a communication network 506, and/or one or more IoT devices 508, such as IoT device 508-1, IoT device 508-2, IoT device 508-3, IoT device 508-4, and IoT device 508-5.

Router 502 can include any suitable computing device(s) for dynamically separating IoT devices in a network. For example, in some embodiments, router 502 can include a DHCP server (not shown). In some embodiments, router 502 can include a AAA server (e.g., RADIUS server) (not shown) to control the DHCP server. In some embodiments, router 502 can perform any suitable function(s), such as configuring separation zones and/or subnets, detecting and configuring IoT devices in a network, monitoring network communication of IoT devices, determining device information of IoT devices, selecting a separation zone or subnet based on the determined device information, dynamically reconfiguring the DHCP server to add or remove separation zones and/or subnets, assigning IoT devices to selected separation zones or subnets, and enforcing access control policy rules, as described above in connection with FIGS. 1-4.

Server(s) 504 can be any suitable server(s) for storing information, data, programs, and/or any other suitable type of content. In some embodiments, server(s) 504 can include an IoT gateway for communicating with IoT devices 508. In some embodiments, server(s) 504 can perform any suitable function(s), such as classifying an IoT device by device category, device type, and/or device posture based on a device fingerprint, remediating an IoT device, indicating that an IoT device is in a vulnerable state, and/or indicating that an IoT device is infected with malware, ransomware, and/or botnets, as described above in connection with FIGS. 1 and 4.

Communication network 506 can be any suitable combination of one or more wired and/or wireless networks in some embodiments. For example, communication network 506 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), BLUETOOTH, BLUETOOTH LE, and/or any other suitable communication network. In some embodiments, IoT devices 508 can be connected by one or more communications links directly to communication network 506 or via router 502. In some embodiments, communication network 506 can be linked via one or more communications links to router 502 and/or server(s) 504. The communications links can be any communications links suitable for communicating data among router 502, server(s) 504, and/or IoT device(s) 508 such as network links, dial-up links, wireless links, hard-wired links, any other suitable communications links, or any suitable combination of such links.

IoT devices 508 can include any one or more IoT devices. For example, in some embodiments, IoT devices 508 can include smart thermostats, smart home devices (e.g., an alarm clock, an electric toothbrush, a scale, a lock, a VoIP phone, and/or any other suitable home device), smart personal assistants, smart exercise machines, smart appliances (e.g., lighting systems, kitchen appliances, washer, dryers, fire alarms, spray systems, and/or any other suitable appliances), smart media systems (e.g., a television, a speaker, a streaming media device, a virtual assistant device, and/or any other suitable media device), smart computing devices (e.g., a mobile phone, a printer, a computer, a network router, and/or any other suitable computing device), smart HVAC systems, smart security systems, and/or any other suitable device capable of connecting to a network to transmit and receive data. In some embodiments, IoT device(s) 508 can perform any suitable function(s), such as performing DHCP communication and/or responding to a probe, as described above in connection with FIGS. 1-4.

In some embodiments, router 502 can configure one or more subnets, such as subnet 510-1, subnet 510-2, and subnet 510-3. In some embodiments, each subnet can correspond to a respective device category, device type, device posture, and/or any other suitable information. For example, in some embodiments, subnet 510-1 can correspond to an isolation subnet, and each of IoT device 508-1 and IoT device 508-2, determined to be in a vulnerable state, can be assigned to isolation subnet 510-1. As another example, in some embodiments, subnet 510-2 can correspond to an environment control subnet, and each of IoT device 508-3 and IoT device 508-4 can be an environment control IoT device (e.g., smart thermostat, smart HVAC system, etc.) assigned to environment control subnet 510-2. As yet another example, in some embodiments, subnet 510-3 can correspond to a newly connected device subnet, and IoT device 508-5 can correspond to a newly connected IoT device assigned to newly connected device subnet 510-3. In some embodiments, router 502 can dynamically add and/or remove one or more subnets, such as when router 502 determines a subnet corresponding to a particular device category, device type, and/or device posture is not already configured or need not remain configured.

Although router 502 and server(s) 504 are each illustrated as one device, the functions performed by device(s) 502 and 504 can be performed using any suitable number of devices in some embodiments. For example, in some embodiments, multiple devices can be used to implement the functions performed by each device(s) 502 and 504.

Although five IoT devices 508-1, 508-2, 508-3, 508-4, and 508-5 are shown in FIG. 5 to avoid over-complicating the figure, any suitable number of IoT devices, and/or any suitable types of IoT devices, can be used in some embodiments.

Figure 6:
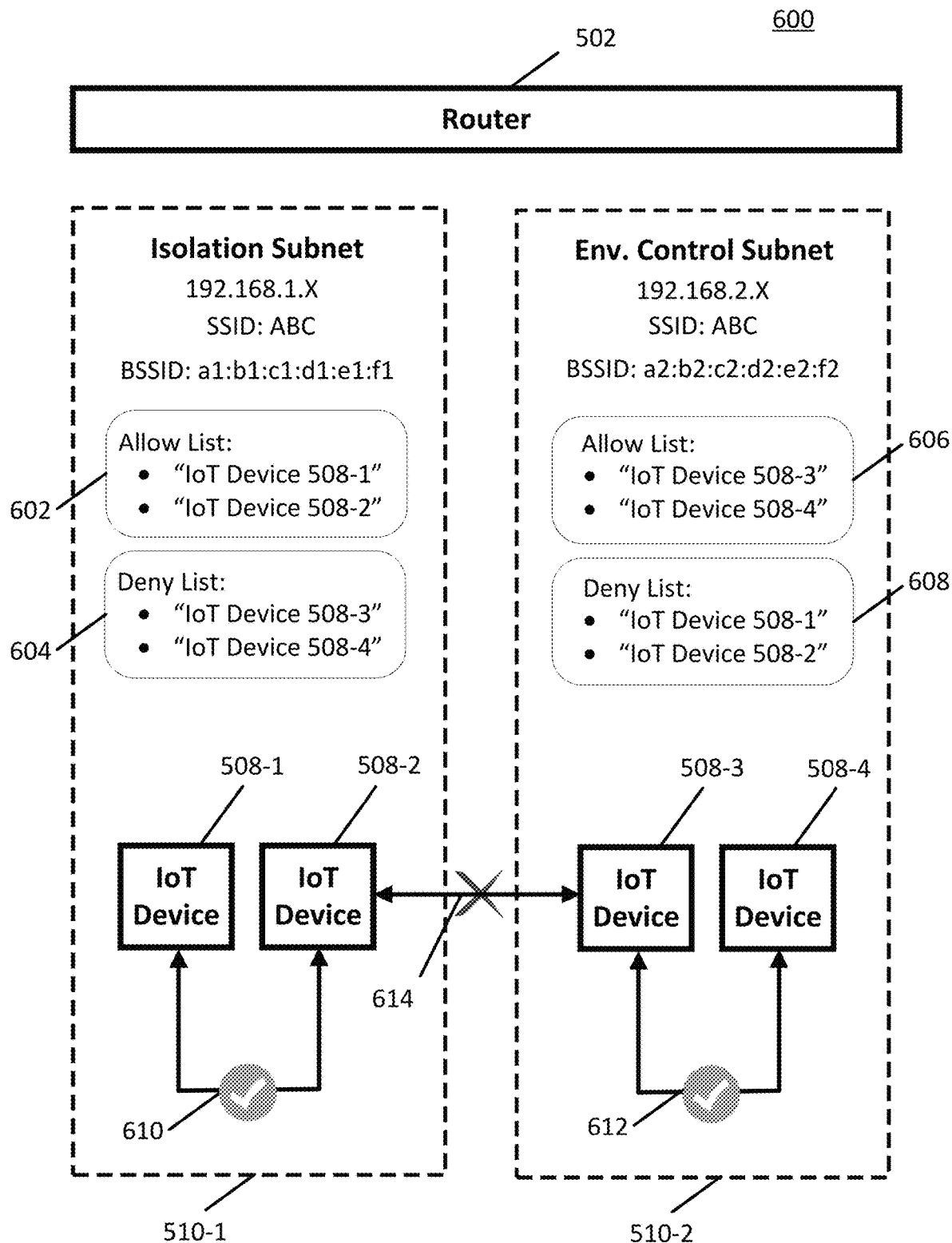
FIG. 6 shows an example of a diagram of an illustrative system suitable for dynamically separating IoT devices in a network in accordance with some embodiments of the disclosed subject matter.
Figure 7:
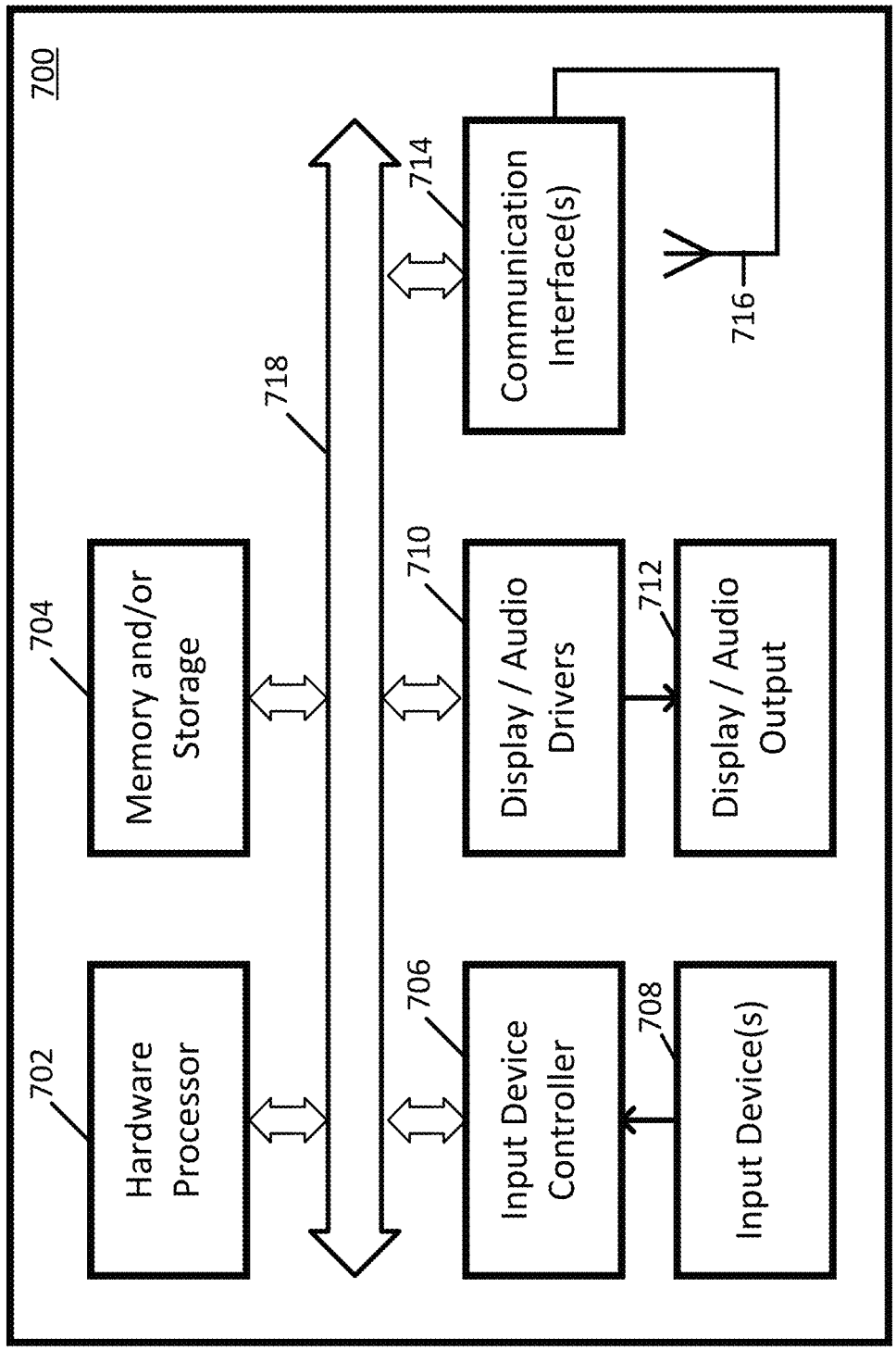
FIG. 7 shows a detailed example of hardware that can be used in a router, an IoT device, and/or a server of FIGS. 5 and 6 in accordance with some embodiments of the disclosed subject matter.

Turning to FIG. 6, an example 600 of a diagram of an illustrative system suitable for dynamically separating IoT devices in a network in accordance with some embodiments of the disclosed subject matter is shown. As illustrated, diagram 600 includes router 502 and/or one or more IoT devices 508 assigned to respective subnets, such as IoT device 508-1 and IoT device 508-2 assigned to isolation subnet 510-1, and IoT device 508-3 and IoT device 508-4 assigned to environment control subnet 510-2.

In some embodiments, the subnets can each be configured with a respective allow list and a respective deny list. For example, in some embodiments, isolation subnet 510-1 can include allow list 602 indicating "IoT Device 508-1" and "IoT Device 508-2," and deny list 604 indicating "IoT Device 508-3" and "IoT Device 508-4." As another example, in some embodiments, environment control subnet 510-2 can include allow list 606 indicating "IoT Device 508-3" and "IoT Device 508-4," and deny list 608 indicating "IoT Device 508-1" and "IoT Device 508-2."

Accordingly, in some embodiments, IoT device separation can be achieved by permitting communication between IoT devices in the same subnet while restricting communication between IoT devices across subnets. For example, in some embodiments, communication 610 between IoT device 508-1 and IoT device 508-2 in isolation subnet 510-1 can be permitted. Similarly, communication 612 between IoT device 508-3 and IoT device 508-4 in environment control subnet 510-2 can also be permitted in some embodiments. However, in some embodiments, communication 614 across isolation subnet 510-1 and environment control subnet 510-2 can be restricted.

Router 502, server(s) 504, and IoT device(s) 508 can be implemented using any suitable hardware in some embodiments. For example, in some embodiments, devices 502, 504, and 508 can be implemented using any suitable general-purpose computer or special-purpose computer. For example, a smart appliance may be implemented using a special-purpose computer. Any such general-purpose computer or special-purpose computer can include any suitable hardware. For example, as illustrated in example hardware 700 of FIG. 7, such hardware can include hardware processor 702, memory and/or storage 704, an input device controller 706, an input device 708, display/audio drivers 710, display and audio output circuitry 712, communication interface(s) 714, an antenna 716, and a bus 718.

Hardware processor 702 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, when router 502 is implemented using hardware 700, hardware processor 702 can be controlled by a program stored in memory and/or storage 704. For example, in some embodiments, the program can cause hardware processor 702 to configure separation zones and/or subnets, detect and configure IoT devices in a network, monitor network communication of IoT devices, determine device information of IoT devices, select a separation zone or subnet based on the determined device information, dynamically reconfigure the DHCP server to add or remove separation zones and/or subnets, assign IoT devices to selected separation zones or subnets, enforce access control policy rules, and/or perform any other suitable functions.

In some embodiments, when server(s) 504 is implemented using hardware 700, hardware processor 702 can be controlled by a server program stored in memory and/or storage 704. For example, in some embodiments, the server program can cause hardware processor 702 to classify an IoT device by device category, device type, and/or device posture based on a device fingerprint, remediate an IoT device, indicate that an IoT device is in a vulnerable state, indicate that an IoT device is infected with malware, ransomware, and/or botnets, and/or perform any other suitable functions.

In some embodiments, when IoT device(s) 508 is implemented using hardware 700, hardware processor 702 can be controlled by a program stored in memory and/or storage 704. For example, in some embodiments, the program can cause hardware processor 702 to perform DHCP communication, respond to a probe, and/or perform any other suitable functions.

Memory and/or storage 704 can be any suitable memory and/or storage for storing programs, data, and/or any other suitable information in some embodiments. For example, memory and/or storage 704 can include random access memory, read-only memory, flash memory, hard disk storage, optical media, and/or any other suitable memory.

Input device controller 706 can be any suitable circuitry for controlling and receiving input from one or more input devices 708 in some embodiments. For example, input device controller 706 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 710 can be any suitable circuitry for controlling and driving output to one or more display/audio output devices 712 in some embodiments. For example, display/audio drivers 710 can be circuitry for driving a touchscreen, a flat-panel display, a cathode ray tube display, a projector, a speaker or speakers, and/or any other suitable display and/or presentation devices.

Communication interface(s) 714 can be any suitable circuitry for interfacing with one or more communication networks (e.g., communication network 506). For example, interface(s) 714 can include network interface card circuitry, wireless communication circuitry, and/or any other suitable type of communication network circuitry.

Antenna 716 can be any suitable one or more antennas for wirelessly communicating with a communication network (e.g., communication network 506) in some embodiments. In some embodiments, antenna 716 can be omitted.

Bus 718 can be any suitable mechanism for communicating between two or more components 702, 704, 706, 710, and 714 in some embodiments.

Any other suitable components can be included in hardware 700 in accordance with some embodiments.

In some embodiments, at least some of the above described blocks of the processes of FIGS. 1-4 can be executed or performed in any order or sequence not limited to the order and sequence shown in and described in connection with the figures. Also, some of the above blocks of FIGS. 1-4 can be executed or performed substantially simultaneously where appropriate or in parallel to reduce latency and processing times. Additionally or alternatively, some of the above described blocks of the processes of FIGS. 1-4 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for dynamically separating IoT devices in a network are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for dynamically separating Internet of Things (IoT) devices in a network, the method comprising:
    detecting a first IoT device in the network having a first Internet Protocol (IP) address;
    monitoring network communication of the first IoT device;
    determining device information of the first IoT device based on the monitored network communication;
    assigning the first IoT device to reconfigure from having the first IP address to having a second IP address of a first subnet of a plurality of subnets in the network based on the device information, wherein the assigning comprises sending at least one Dynamic Host Configuration Protocol (DHCP) message to cause the first IoT device to reconfigure to the second IP address;
    determining that the first IoT device has not reconfigured from having the first IP address to having the second IP address in response to being assigned to the first subnet; and
    in response to determining that the first IoT device has not reconfigured from the first IP address to the second IP address in response to being assigned to the first subnet, adding a media access control (MAC) address of the first IoT device to a deny list of a host access point.

2. The method of claim 1, further comprising restricting communication between the first IoT device configured to communicate on the first subnet and a second IoT device configured to communicate on a second subnet of the plurality of subnets.

3. The method of claim 1, further comprising dynamically creating the first subnet in response to determining the device information.

4. The method of claim 1, further comprising allowing the first IoT device to communicate with a remediation server.

5. The method of claim 1, further comprising:
    detecting an anomaly associated with the first IoT device.

6. A system for dynamically separating IoT devices in a network, the system comprising:
    a memory; and
    a hardware processor that is coupled to the memory and that is configured to:
        detect a first IoT device in the network having a first Internet Protocol (IP) address;
        monitor network communication of the first IoT device;
        determine device information of the first IoT device based on the monitored network communication;
        assign the first IoT device to reconfigure from having the first IP address to having a second IP address of a first subnet of a plurality of subnets in the network based on the device information, wherein the assigning comprises sending at least one Dynamic Host Configuration Protocol (DHCP) message to cause the first IoT device to reconfigure to the second IP address;

determine that the first IoT device has not reconfigured from having the first IP address to having the second IP address in response to being assigned to the first subnet; and in response to determining that the first IoT device has not reconfigured from the first IP address to the second IP address in response to being assigned to the first subnet, add a media access control (MAC) address of the first IoT device to a deny list of a host access point.

7. The system of claim 6, wherein the hardware processor is further configured to restrict communication between the first IoT device configured to communicate on the first subnet and a second IoT device configured to communicate on a second subnet of the plurality of subnets.

8. The system of claim 6, wherein the hardware processor is further configured to dynamically create the first subnet in response to determining the device information.

9. The system of claim 6, wherein the hardware processor is further configured to allow the first IoT device to communicate with a remediation server.

10. The system of claim 6, wherein the hardware processor is further configured to:
    detect an anomaly associated with the first IoT device.

11. A non-transitory computer-readable medium containing computer-executable instructions that, when executed by a processor, cause the processor to perform a method for dynamically separating IoT devices in a network, the method comprising:
    detecting a first IoT device in the network having a first Internet Protocol (IP) address;
    monitoring network communication of the first IoT device;
    determining device information of the first IoT device based on the monitored network communication;
    assigning the first IoT device to reconfigure from having the first IP address to having a second IP address of a first subnet of a plurality of subnets in the network based on the device information, wherein the assigning comprises sending at least one Dynamic Host Configuration Protocol (DHCP) message to cause the first IoT device to reconfigure to the second IP address;
    determining that the first IoT device has not reconfigured from having the first IP address to having the second IP address in response to being assigned to the first subnet; and
    in response to determining that the first IoT device has not reconfigured from the first IP address to the second IP address in response to being assigned to the first subnet, adding a media access control (MAC) address of the first IoT device to a deny list of a host access point.

12. The non-transitory computer-readable medium of claim 11, the method further comprising restricting communication between the first IoT device configured to communicate on the first subnet and a second IoT device configured to communicate on a second subnet of the plurality of subnets.

13. The non-transitory computer-readable medium of claim 11, the method further comprising dynamically creating the first subnet in response to determining the device information.

14. The non-transitory computer-readable medium of claim 11, the method further comprising allowing the first IoT device to communicate with a remediation server.

15. The non-transitory computer-readable medium of claim 11, the method further comprising:
    detecting an anomaly associated with the IoT device.

* * * * *